March 10, 1970  J. GIJZENBERG  3,499,494
DEVICE FOR WORKING THE SOIL, ESPECIALLY
FOR HARROWING FARMLAND
Filed Nov. 14, 1966  4 Sheets-Sheet 1
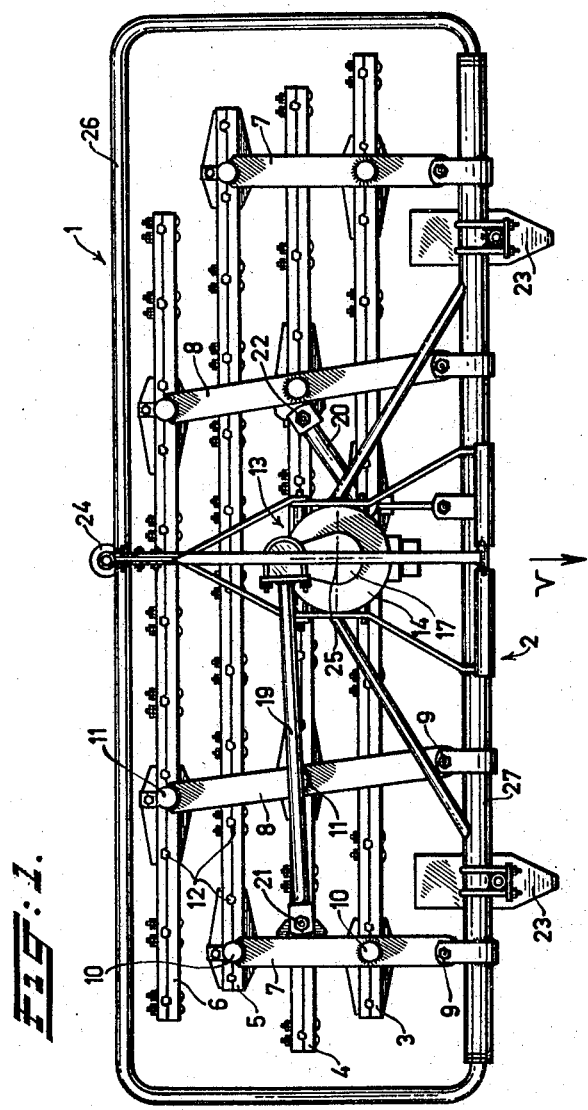
INVENTOR.
JOOST GIJZENBERG
BY
*Imrie & Smiley*
Att'ys.

March 10, 1970  J. GIJZENBERG  3,499,494
DEVICE FOR WORKING THE SOIL, ESPECIALLY
FOR HARROWING FARMLAND
Filed Nov. 14, 1966  4 Sheets-Sheet 2
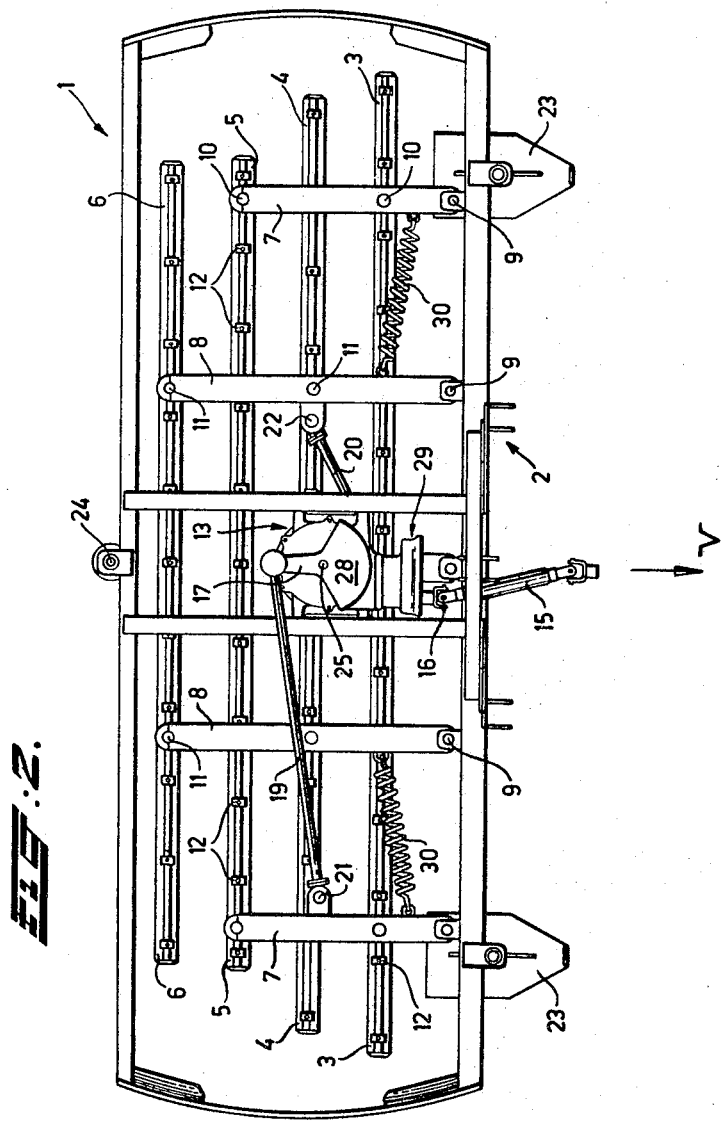
INVENTOR.
JOOST GIJZENBERG
BY
Attys.

March 10, 1970     J. GIJZENBERG     3,499,494
DEVICE FOR WORKING THE SOIL, ESPECIALLY
FOR HARROWING FARMLAND Filed Nov. 14, 1966     4 Sheets-Sheet 3

INVENTOR.
JOOST GIJZENBERG

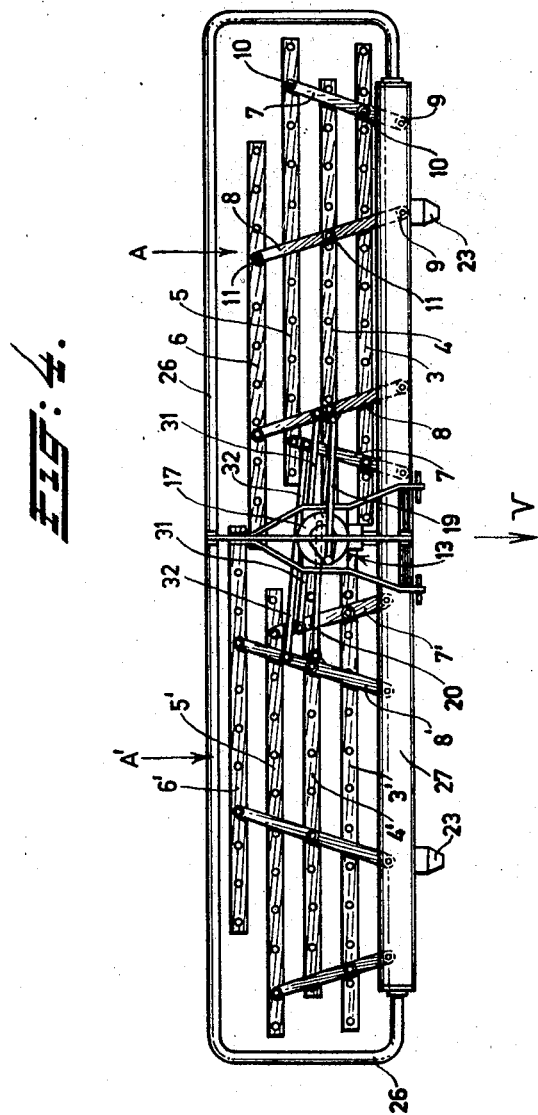

United States Patent Office 3,499,494
Patented Mar. 10, 1970

3,499,494
DEVICE FOR WORKING THE SOIL, ESPECIALLY FOR HARROWING FARMLAND
Joost Gijzenberg, Aalsmeerderweg 933, Rijsenhout-Post Aalsmeer, Netherlands
Filed Nov. 14, 1966, Ser. No. 593,824
Claims priority, application Belgium, Nov. 19, 1965, 45,117, Patent 672,528
Int. Cl. A01b 19/06, 23/00, 25/00
U.S. Cl. 172—53       8 Claims

ABSTRACT OF THE DISCLOSURE

A device for harrowing farmland comprising a plurality of reciprocating horizontal parallel beams lying mainly perpendicular to the direction of travel of the device, each beam carrying a number of spaced tines, said device further comprising a driving mechanism for reciprocating the beams, means being provided for balancing the inertia forces and for leveling the peak loads, said means comprising either driving rods of different length, counterweights, springs, unevenly spaced crank arms or a combination of these elements.

---

The invention relates to a device for harrowing farmland comprising a frame provided with at least two beams or groups of beams, having a plurality of tines, which are capable of reciprocation in uneven phase, the frame being further provided with means by which it can be carried and/or advanced over the ground, a driving mechanism being provided with crank arms which each via a driving rod are connected with a beam or group of beams. Such a device is described in Patent No. 3,186,495 and application No. 509,998, filed Nov. 22, 1965.

In a slightly larger construction of such a device, when the operative speed is increased, sometimes trouble is encountered in relation to inertia forces produced by the reciprocating beams. Great differences of load are also produced in the driving mechanism owing to the coincidence of the forces of acceleration for the reciprocation.

It is an object of the invention to provide an improvement in this respect which object is attained in that means are provided for at least partially balancing the inertia forces produced and spreading the peaks of load.

The aforementioned means may be constructed in various ways. For instance these means may be formed by the driving rods which for that purpose are constructed in a different length. The two beams, or the two groups of beams will thus perform a slightly different movement with substantially the same amplitude so that a certain compensation in the forces produced is obtained. This compensation is still improved when on at least one of the crank arms a counterweight, revolving therewith, is mounted.

The invention further aims to increase the capacity of the device for the purpose of widening the area on which in a single operation the soil can be worked.

The foregoing and other objects and advantages of the invention will appear in the description to follow. In the description reference is made to the accompanying drawings, which form a part hereof, and in which there is shown by way of illustration and not of limitation a specific form in which the invention may be embodied.

In the drawings:

FIG. 1 shows a plan view of a first embodiment with unequal driving rod lengths and a slightly forwardly positioned driving mechanism.

FIGURES 2 and 3 represent a plan view and a side elevation, of an embodiment in which springs are applied.

FIGURE 4 shows a modified embodiment wherein two units are accommodated in a common frame in such a way that one unit is the slightly staggered mirror image of the other.

Figure 5:
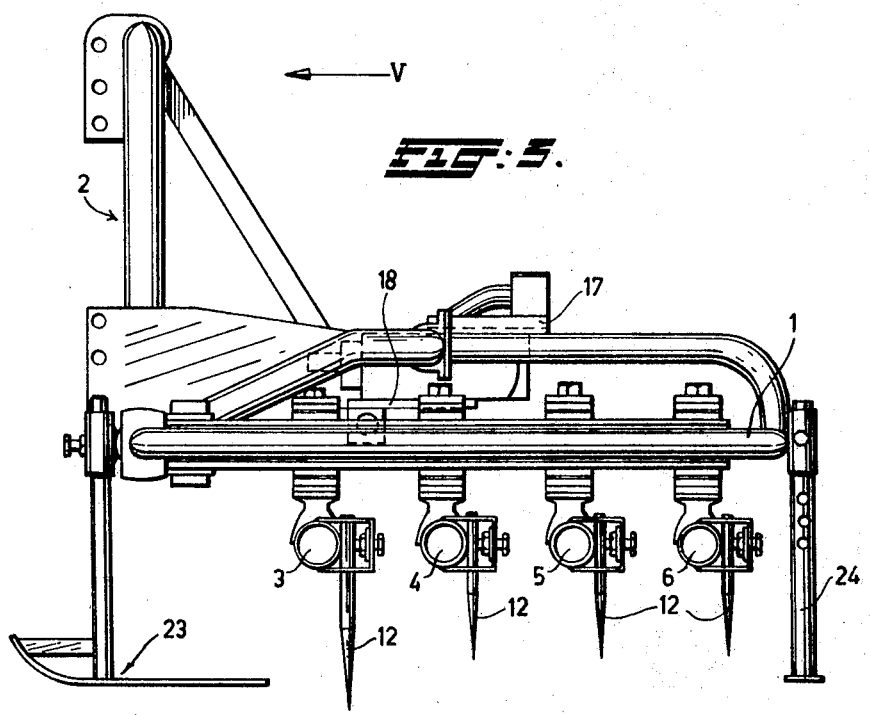

The harrow is composed of a frame 1 of a substantially rectangular shape which on its front side, to be connected with a tractor (not shown), is provided with a three point suspension 2. Provided within this frame 1, but in a plane slightly thereunder are four harrow beams 3–6 which are supported by longitudinal arms 7 and 8. These longitudinal arms 7 and 8 are pivotally connected at 9 with the front side of the frame 1.

The outer longitudinal arms 7 are shorter than the inner longitudinal arms 8. The longitudinal arms 7 are connected with the harrow beams 3 and 5 via the pivots 10. The longitudinal arms 8 are connected with the harrow beams 4 and 6 via the pivots 11.

Each harrow beam 3–6 extending in a direction transverse to the normal direction of advance (arrow V) is provided with tines 12 which are disposed as far as the vicinity of the ends of the beams. The beams 3 and 5 constitute a first pair of beams carried by the arms 7, while the beams 4 and 6 constitute a second pair supported by the arms 8.

The harrow is further provided with a driving mechanism 13 for reciprocating the beams 3–6 in a longitudinal diection. This driving mechanism 13 is not (like in the aforementoned embodiment of the prior patent applications) centrally disposed between a long and a short longitudinal arm 8, and 7 respectively, but centrally between the sides of the frame 1. The mechanism 13 consists of a bevel gearing in a casing 14 which receives its drive from a coupling shaft 15 and a universal joint 16 (see FIGURE 2). The shaft 15 is connected via conventional means with the power take off shaft of a tractor (not shown). The driving mechanism is further provided with two crank arms 17 and 18 which are 180° out of phase with respect to each other (see FIGURE 3). The upper crank arm 17 is connected with one of the outer longitudinal arms 7 via a driving rod 19. The lower crank arm 18 is connected with one of the inner longitudinal arms 8 via a driving rod 20. The driving rods 19 and 20 are coupled to the said longitudinal arms via a hinge 21 and 22 respectively.

Due to the aforementioned positioning of the driving mechanism 13 and the unequal lengths of the driving rods 19 and 20, the angular disposition of the drive member 13 at which the respective arms 7 and 8 reach the ends of their strokes will not coincide. As a result, the peak load of the bevel gearing in the mechanism 13 is spread.

The central location of the driving mechanism 13 is further advantageous in that the angle of the coupling shaft 15 can remain small so that the stress of the universal joint 16 does not become too high.

Provided on the front side of the frame 1 are two shoes 23 serving to guide the harrow in depth, while in the vicinity of the rear an additional supporting leg 24 is provided which is only used when the harrow is out of action.

The arrangement of the driving mechanism 13 is such that the various parts 17–20 of this mechanism move substantially in planes which are parallel to the plane through the harrow beams 3–6. The two crank arms 17 and 18 turn on a common centre line 25 which is perpendicular to this plane and move each in separate but parallel plane.

The frame of the device consists of a tube 26 which is bent into a rectangular form and which constitutes at least the two sides and the rear of the frame. The front side of the frame consists of a box-shaped beam 27 which is provided with the three point suspension 2 as well as with the shoes 23.

In the embodiment according to FIGURE 1 the centre line 25 of the driving mechanism 13 is situated before the line through the junctions 21 and 22 of the driving rods 19 and 20 with the longitudinal arm 7, 8 respectively. Due to this feature the two pairs of harrow beams have a dissimilar oscillatory track which is favourable for avoiding the coincidence of load peaks originating from the two pairs of harrow beams. An analogous effect can be obtained when the centre line 25 is situated behind the line 21-22.

In the embodiment according to FIGURE 1 the angular displacement of the two crank arms 17 and 18 is not 180°. Due to the fact that an unequal length of the driving rods 19 and 20 is applied in the proper way, in combination with an angular position of the two crank arms 17 and 18 which deviates more or less from 180°, whether or not with a definite distance between the centre line 25 and the connecting line between the junctions 21, 22, it becomes possible to promote the steady run of the device and to influence the harrowing pattern and furthermore to even out occurring fluctuations in the load of the driving mechanism 13.

It should be noted that in order to facilitate transport of the device on the road, one or more detachable wheels can be provided under the frame 1 in such a way that the tractor can be coupled to one of the sides of the frame. In this way the operative width of the device is turned a quarter turn and there are no longer any objections against the transport by road between the farm and the field.

The device according to FIGURES 2 and 3 distinguished in some respects from that according to FIGURE 1. Provided on the crank arms 17 and 18 and diametrically opposite to the points of application of the driving rods 19 and 20 a counter weight 28 is applied capable of revolving with the crank arms. Further, the driving mechanism 13 is provided with means 29 for changing the frequency of the reciprocating movement of the harrow beams 3-6. This means consists of a gear drive provided with detachable wheels with which the transmission ratio between the power take off shaft of the tractor and the driving mechanism 13 can be modified. In this way it becomes possible to relate the effect of the harrow to the conditions of the ground, to the season and to the kind of treatment aimed at.

By making the crank arms 17 and 18 of different lengths or by choosing the distance centre to centre between 9 and 22 different from that between 9 and 21, the angular displacement (the oscillatory path) of the short longitudinal arms 7 will become different from that of the longitudinal arms 8. In order to impart the same operative width to the harrow beams, the length thereof can be related in a compensatory sense to the difference in amplitude. It is advantageous when the sum of the effective length of the hindmost harrow beam 6 and the double value of the amplitude of the reciprocating movement is greater than the sum of the same values for the other harrow beams 3-5. In this way the formation of ridges of earth on either side of the worked strip of soil is avoided.

Yet another point of difference of the embodiment according to FIGURE 2 is that a tension spring 30 is provided between two pairs of dissimilar longitudinal arms 7 and 8 respectively. It is evident that when the device is in operation the one spring 30 is tensioned and the other is released. The additional forces generated hereby are working in a compensatory sense with respect to the acceleration forces produced and are therefore favourable to the driving mechanism 13.

In the embodiment according to FIGURE 4 two complete units A and A', each consisting of two pairs oppositely reciprocated beams 3-6 and 3'-6', are provided in such a way that one unit is the mirror image of the other. The positions of the two units are slightly staggered, so that the movements of the various beams do not hinder each other in spite of the fact that they slightly overlap one the other. Both units are driven by the same driving mechanism 13 as depicted in the preceding figures. The upper crank arm 17 is connected via a driving rod 19 with one of the inner longitudinal arms 8 of the unit A at the right and also via a second rod 31 with one of the outer arms 7' of the left unit A'. In the same way the lower crank arm 18 (not shown) is connected via a driving rod 20 with one of the inner arms 8' and via a second rod 32 with one of the outer arms 7. In this way the reciprocation in an opposite direction is obtained so that the inertia forces are almost balanced.

What I claim is:

1. In a device for working the soil, of the type having a frame adapted to be attached to a towing vehicle, at least two transversely extending beams disposed one behind the other and adapted to reciprocate transversely of the frame and having depending tines for working the soil, the improvement comprising:
   drive means located between the opposite sides of said frame and comprising a crank assembly rotatably mounted about a vertical axis,
   a first pair of arms on opposite sides of said vertical axis pivotally attached to said frame and to one of said beams,
   a second pair of arms on opposite sides of said vertical axis pivotally attached to said frame and to the other of said beams,
   said crank assembly including a pair of crank arms extending generally oppositely from said vertical axis,
   a first rod pivotally connected at its opposite ends to one of said crank arms and one of said first pair of arms,
   a second rod pivotally connected at its opposite ends to the other of said crank arms and one of said second pair of arms,
   said first and second rods being of unequal lengths and the lengths of said first pair of arms between their points of pivotal connection to the frame and their points of pivotal connection to said one beam being different from the lengths of said second pair of arms between their points of pivotal connection to the frame and their points of pivotal connection to said other beam such that said beams reach the ends of their strokes at different rotational positions of said drive means whereby peak loads on said drive means are spread apart through the angular rotation of said drive means.

2. The device according to claim 1 wherein said crank arms are displaced about said vertical axis by an angle less than 180°.

3. In a device for working the soil, of the type having a frame adapted to be attached to a towing vehicle, at least two transversely extending beams disposed one behind the other and adapted to reciprocate transversely of the frame and having depending tines for working the soil, the improvement comprising:
   drive means centrally located between the opposite sides of said frame and comprising a crank assembly rotatably mounted about a vertical axis,
   a first pair of arms pivotally attached to said frame and to one of said beams,
   a second pair of arms pivotally attached to said frame and to the other of said beams,
   said crank assembly including a pair of crank arms extending generally oppositely from said vertical axis,
   a first rod pivotally connected at its opposite ends to one of said crank arms and one of said first pair of arms,
   a second rod pivtally connected at its opposite ends to the other of said crank arms and one of said second pair of arms,
   said first and second rods being of unequal lengths such that said beams reach the ends of their strokes at different rotational positions of said drive means whereby peak loads on said drive means are spread apart through the angular rotation of said drive means, the line connecting the pivotal connections between said rods and said pairs of arms being longitudinally offset with respect to a transverse line passing through said axis.

4. The device according to claim 3 including a pair of tension springs interconnecting adjacent arms of the two pairs of arms whereby one tension spring is always being relaxed while the other is being stretched.

5. The device according to claim 4 wherein said crank arms are displaced about said vertical axis by an angle less than 180°.

6. In a device for working the soil, of the type having a frame adapted to be attached to a towing vehicle, at least two transversely extending beams disposed one behind the other and adapted to reciprocate transversely of the frame and having depending tines for working the soil, the improvement comprising:

drive means centrally located between the opposite sides of said frame and comprising a crank assembly rotatably mounted about a vertical axis, a first pair of arms pivotally attached to said frame and to one of said beams, a second pair of arms pivotally attached to said frame and to the other of said beams, said crank assembly including a pair of crank arms extending generally oppositely from said vertical axis, a first rod pivotally connected at its opposite ends to one of said crank arms and one of said first pair of arms, a second rod pivotally connected at its opposite ends to the other of said crank arms and one of said second pair of arms, said first and second rods being of unequal lengths such that said beams reach the ends of their strokes at different rotational positions of said drive means whereby peak loads on said drive means are spread apart through the angular rotation of said drive means, a pair of tension springs interconnecting adjacent arms of the two pairs of arms whereby one tension spring is always being relaxed while the other is being stretched.

7. The device according to claim 6 wherein said crank arms are displaced about said vertical axis by an angle less than 180°.

8. In a device for working the soil, of the type having a frame adapted to be attached to a towing vehicle, at least two transversely extending beams disposed one behind the other and adapted to reciprocate transversely of the frame and having depending tines for working the soil, the improvement comprising:

drive means centrally located between the opposite sides of said frame and comprising a crank assembly rotatably mounted about a vertical axis, a first pair of arms pivotally attached to said frame and to one of said beams, a second pair of arms pivotally attached to said frame and to the other of said beams, said crank assembly including a pair of crank arms extending generally oppositely from said vertical axis, a first rod pivotally connected at its opposite ends to one of said crank arms and one of said first pair of arms, a second rod pivotally connected at its opposite ends to the other of said crank arms and one of said second pair of arms, said first and second rods being of unequal lengths such that said beams reach the ends of their strokes at different rotational positions of said drive means whereby peak loads on said drive means are spread apart through the angular rotation of said drive means, at least two additional transversely extending beams disposed one behind the other and in transversely spaced relation to the first said beams, a pair of arms pivotally attaching each additional beam to said frame, and rod means connecting said additional beams to said drive means for oscillating said additional beams in opposition to the corresponding beams of the first said beams.

References Cited

UNITED STATES PATENTS 3,186,495   6/1965   Gijzenberg _____ 172—102

ROBERT E. PULFREY, Primary Examiner

W. J. CONLON, Assistant Examiner

U.S. Cl. X.R.

172—79, 101, 102